US009875570B2

(12) United States Patent
Gyger et al.

(10) Patent No.: US 9,875,570 B2
(45) Date of Patent: Jan. 23, 2018

(54) METHOD FOR PROCESSING IMAGE DATA REPRESENTING A THREE-DIMENSIONAL VOLUME (71) Applicants: Cyrill Gyger, Frick (CH); Peter Maloca, Lucerne (CH)

(72) Inventors: Cyrill Gyger, Frick (CH); Peter Maloca, Lucerne (CH)

(*) Notice: Subject to any disclaimer, the term of this patent is extended or adjusted under 35 U.S.C. 154(b) by 126 days.

(21) Appl. No.: 14/454,273

(22) Filed: Aug. 7, 2014

(65) Prior Publication Data
US 2015/0123970 A1 May 7, 2015

(30) Foreign Application Priority Data

Nov. 4, 2013 (EP) .................................... 13405127

(51) Int. Cl.
G06T 19/00 (2011.01)
G06T 17/20 (2006.01)
(Continued)

(52) U.S. Cl.
CPC ............... G06T 15/08 (2013.01); G06T 5/002 (2013.01); G06T 5/20 (2013.01); G06T 2200/04 (2013.01);
(Continued)

(58) Field of Classification Search
CPC .......... G06T 19/00; G06T 17/20; G06T 15/08
(Continued)

(56) References Cited

U.S. PATENT DOCUMENTS 6,996,176 B1* 2/2006 Chang ................... G06T 7/2026
348/E5.066
2005/0105828 A1* 5/2005 Oosawa ................. A61B 6/032
382/294
(Continued)

FOREIGN PATENT DOCUMENTS

EP 1 387 317 A1 2/2004
EP 1 649 810 A1 4/2006

OTHER PUBLICATIONS

Andres Fco Sole et al., "Anisotropic 2-D and 3-D Averaging of FMRI Signals", IEEE, Transactions on Medical Imaging, vol. 20, No. 2, Feb. 2001, pp. 86-93.
(Continued)

Primary Examiner — Zhengxi Liu
Assistant Examiner — Yi Yang
(74) Attorney, Agent, or Firm — Birch, Stewart, Kolasch & Birch, LLP (57) ABSTRACT A method for processing image data representing a three-dimensional volume, the data comprising image values for a three-dimensional grid of voxels, comprising: starting from a given voxel building up a vector path along a first dimension of the three dimensional volume, connecting a number of voxels of two-dimensional slices of the grid adjacent in the first dimension, the connected voxels representing a spatial neighborhood of the given voxel, including structurally related voxels of the three-dimensional grid; averaging the image values of the voxels of the vector path to obtain a first averaged value, assigned to the given voxel position; repeating the aforementioned steps for a number of voxels; repeating the aforementioned steps on the first averaged values, employing vector paths along a second dimension being different from the first dimension, obtaining second averaged values; and on the second averaged values repeating the aforementioned steps, employing vector
(Continued)

paths along a third dimension being different from the first and the second dimension. Thus, filtered values are obtained that constitute processed image data representing the three dimensional volume.

11 Claims, 5 Drawing Sheets

(51) Int. Cl.
    *G06T 15/08* (2011.01)
    *G06T 5/00* (2006.01)
    *G06T 5/20* (2006.01)

(52) U.S. Cl.
    CPC ............ *G06T 2207/10072* (2013.01); *G06T 2207/10081* (2013.01); *G06T 2207/10088* (2013.01); *G06T 2207/10101* (2013.01); *G06T 2207/10104* (2013.01); *G06T 2207/10108* (2013.01); *G06T 2207/10132* (2013.01); *G06T 2207/30004* (2013.01)

(58) Field of Classification Search
    USPC ........................................ 345/419, 420, 424
    See application file for complete search history.

(56) References Cited

U.S. PATENT DOCUMENTS

| | | | | |
|---|---|---|---|---|
| 2005/0226360 A1* | 10/2005 | Kaucic, Jr. | ........... | G01N 23/046 378/4 |
| 2007/0040831 A1 | 2/2007 | Flohr et al. | | |
| 2008/0123992 A1 | 5/2008 | Tian et al. | | |
| 2010/0074516 A1* | 3/2010 | Kawaragi | ............ | G01N 21/956 382/149 |
| 2010/0157041 A1* | 6/2010 | Klaiman | ............... | G06T 7/0022 348/77 |
| 2011/0050848 A1* | 3/2011 | Rohaly | ................... | G06T 15/10 348/43 |
| 2012/0249546 A1* | 10/2012 | Tschirren | ................ | G06T 19/00 345/419 |
| 2012/0274897 A1* | 11/2012 | Narasimha-Iyer | ..... | A61B 3/102 351/206 |
| 2013/0120451 A1* | 5/2013 | Sasaki | .................... | G06T 15/00 345/633 |

OTHER PUBLICATIONS

Jong-Sen Lee, "Speckle Analysis and Smoothing of Synthetic Aperture Radar Images", Computer Graphics and Image Processing, 17, pp. 24-32, (1981).

Leonid I. Rudin et al., "Nonlinear total variation based noise removal algorithms", Physica D 60 (1992), pp. 259-268.

Pietro Perona et al., "Scale-Space and Edge Detection Using Anisotropic Diffusion", IEEE Transactions on Pattern Analysis and Machine Intelligence, vol. 12, No. 7, Jul. 1990, pp. 629-639.

Victor S. Frost et al. "A Model for Radar Images and Its Application to Adaptive Digital Filtering of Multiplicative Noise", IEEE Transactions on Pattern Analysis and Machine Intelligence, vol. Pami-4, No. 2, Mar. 1982, pp. 157-166.

* cited by examiner

METHOD FOR PROCESSING IMAGE DATA REPRESENTING A THREE-DIMENSIONAL VOLUME

TECHNICAL FIELD

The invention relates to a method for processing image data representing a three-dimensional volume, the data comprising image values for a three-dimensional grid of voxels. The invention further relates to use of the method for processing biological image data.

BACKGROUND ART

Today, three-dimensional imaging is a widely established technique in the field of medical diagnosis. A series of established techniques like magnetic resonance imaging (MRI), computed tomography (CT), optical coherence tomography (OCT), positron emission tomography (PET), single-photon emission computed tomography (SPECT) and ultrasonic imaging (US), as well as various specialized or experimental and less common techniques allow the acquisition of three-dimensional scans. Such volumetric scans are usually built by collecting a series of subsequent two-dimensional scans (slices) at slightly shifted positions (targeting a uniform intra-slice distance) and reconstructing a 3D scan from these single slices. The corresponding image data usually comprises image values (such as luminance and/or color values etc.) for a three-dimensional grid of voxels. "Voxel" designates a volume element of the grid, represented by one or a plurality of the image values mentioned.

Compared to two-dimensional medical imaging, the third spatial dimension delivers a significant information gain and often leads to more insight supporting the diagnosis.

A major drawback in medical imaging arises from image noise which occurs in almost every acquisition method and leads to an irregular granular pattern. In MRI, noise is influenced by the resistance of the receiving coil and by inductive losses in the sample and depends on the static magnetic field and the sample volume size. Noise in magnitude MRI images is Rician distributed, based on the assumption of zero-mean uncorrelated Gaussian noise in the real and the imaginary signal parts. CT shows the Poisson distributed X-ray noise characteristics and depends on the number of photons that leave the source, the amount of photons that pass unaffected through the sample, those who are captured by the detector, and those which underlie scattering and also surrounding light photons. OCT suffers from speckle noise its origin lying in the coherent nature of this scanning technique. Multiple scattering in the tissue manipulates the incoming light waves in the sense of a two-dimensional random walk (real and imaginary dimension). This leads to identically normal distributed real and imaginary components with zero mean and identical standard deviation that causes the noise magnitude to follow a Rayleigh distribution.

Even though the cause and characteristic of the noise differs from modality to modality, its influence to the information content of the image is always degrading. While noise reduction for two-dimensional images is and has been prospected very actively since decades, three-dimensional denoising mainly came in focus with the emerging research in volumetric imaging and only limited efforts for specialized volume denoising methods has been made so far, often by adapting known 2D-filters to an additional dimension. Established and well known methods in this category are the Lee filter (J. S. Lee, "Speckle analysis and smoothing of synthetic aperture radar images", Graph. Model. Im. Proc. 17(1), 24-32, 1981), the Frost filter (V. S. Frost, J. A. Stiles, A. Josephine, K. S. Shanmugan, and J. C. Holtzman, "A model for radar images and its application to adaptive digital filtering of multiplicative noise", IEEE Trans. Pattern Anal. Mach. Intell. 4(2), 157-166, 1982), the Anisotropic diffusion (P. Perona and J. Malik, "Scale-Space and Edge Detection Using Anisotropic Diffusion", IEEE Trans. Pattern Anal. Mach. Intell., vol. 12, no. 7, pp. 629-639, 1990) and Total Variation minimization (L. I. Rudin, S. Osher, and E. Fatemi, "Nonlinear total variation based noise removal algorithms", Physica D 60, 259-268, 1992), all extended to a three-dimensional neighborhood.

Due to the fact that 3D images normally feature a substantially more complex information structure than 2D images (e.g. edges in 2D are surfaces in 3D), such direct extensions may not be able to consider the 3D information efficiently. Adaptations and variations therefore try to improve the information consideration of the third dimension as much as possible. The Anisotropic Diffusion was adapted and combined for 3D volumetric data by several approaches in the past years. Other studies cover volumetric denoising by 3D wavelet transformation, Non-Local Means, sparseness and self-similarity, local surface approximation, and others. Some research has also been done in terms of 4D denoising (volumetric plus time).

But still, for many situations the major part of these adapted approaches often deliver insufficient results, especially for subsequent processing steps like image segmentation or content recognition in the context of strong noise occurrence.

SUMMARY OF THE INVENTION

It is the object of the invention to create a method pertaining to the technical field initially mentioned, that allows for efficient noise reduction of three-dimensional image data, in particular in the context of medical imaging applications.

The solution of the invention is specified by the features of claim 1. According to the invention the method comprises the following steps:
a) Starting from a given voxel, a vector path along a first dimension of the three dimensional volume is built up, connecting a number of voxels of two-dimensional slices of the grid adjacent in the first dimension. The connected voxels represent a spatial neighborhood of the given voxel that includes structurally related voxels of the three-dimensional grid.
b) Starting from a given voxel a vector path along a second dimension of the three dimensional volume is built up, the second dimension being different from the first dimension, the vector path connecting a number of voxels of two-dimensional slices of the grid adjacent in the second dimension. The connected voxels represent a spatial neighborhood of the given voxel that includes structurally related voxels of the three-dimensional grid.
c) Starting from a given voxel a vector path along a third dimension of the three dimensional volume is built up, the third dimension being different from the first and the second dimensions, the vector path connecting a number of voxels of two-dimensional slices of the grid adjacent in the third dimension. The connected voxels represent a spatial neighborhood of the given voxel, including structurally related voxels of the three-dimensional grid.

d) Image values of voxels of the vector paths are averaged to obtain an averaged value, assigned to the given voxel position.

e) Steps a) to d) are repeated for a number of voxels.

The vector path along a given dimension includes a number of voxels, neighboring voxels of the path being in slices of the grid that are adjacent to each other, in the direction of the given dimension. To be clear, in addition to the distance in the given dimension, adjacent elements of the vector path may but need not to have a distance along any of the two other dimensions. As discussed below, the vector path will have a certain length. Usually, it will not extend along the entire given dimension.

In the following, "averaging" relates to any method of assigning a central or typical value to a set of values, i.e. the first and second averaged value as well as the filtered value represent a typical value of the image values or the first or second averaged values, respectively. Among others, such typical values of a list of values include mean values (including weighted means), median values or modes.

Preferably, the steps a) and b) are applied to every voxel of the three-dimensional grid of voxels. As shown below, different successions of steps a)-e) are feasible.

The noise reduction method matches structural relatedness along all dimensions and builds up individual vector paths for every voxel in the image volume representing its structural neighborhood, i.e. a vector path traces the geometry of a given structure through a number of slices. The method makes thus use of the larger information content of 3D scans compared to single slice images and considers the redundancy found in that information space. Redundancy cannot only be found at exactly the same physical place; it also appears in related structures and objects in space. By considering the information redundancy along the vector paths, the filter is thus able to reduce various kinds of noise in a remarkable way while preserving structural information at the same time.

Tests have shown that the inventive method exceeds some major three-dimensional denoising algorithms used for medical images both in visual rendering quality as well as in measurable noise reduction. With respect to visual rendering quality, not only noise is reduced drastically, but smoothing or fraying of edges and contours is prevented at the same time. By considering structural relatedness while filtering, contours and edges even get enhanced. Compared to some widely established filters for noise reduction in 3D medical imaging (Frost, Lee, Total Variation Denoising, Anisotropic Diffusion) the filter exceeds all measured results of noise and structure preservation indicators (PSNR, RMSE, SSIM). Having an improved image quality allows for a more comprehensive and more reliable analysis of the image data, manually by an operator as well as employing computer-based automatic analysis tools. In particular, surfaces delimiting specific structures may be identified more easily. In addition to analysis and diagnosis, the method has also an application in image based surgery.

The filter is inspired by methods from another technical domain, namely film grain removal. In this field, algorithms are known that take the temporal dimension of a film into account to filter out film grain. The visual result of such methods is quite good because film grain is randomly distributed and the probability of grain existence at one and the same position in two successive frames is relatively low. Instead of two spatial dimensions plus time as it is the case for films, 3D imaging has three spatial dimensions. And instead of matching motion, structural relatedness is matched. To use the information content of all three dimensions best, filtering is not done only in one single dimension but in all three dimensions.

The inventive method yields filtered three-dimensional image data. As usual, this data may be represented in two dimensions, showing slices through the volume, or in three dimensions, e.g. by oblique cut-away, scroll through or fly-through of successive slices or en face project. It is to be noted that the inventive method may be applied as well to four-dimensional data, i.e. three spatial dimensions and time. It is suitable for noise reduction in the context of animated three-dimensional data.

The method is particularly well suited for the processing of biological image data, preferably image data obtained from a positron emission tomography (PET), a single-photon emission computed tomography (SPECT) and/or an ultrasonic imaging (US) process, most preferably image data obtained from a magnetic resonance imaging (MRI), a computed tomography (CT) and/or an optical coherence tomography (OCT) process.

Biological image data includes in particular medical image data for clinical purposes or medical science. It has shown that the method is applicable and yields favorable results in the context of three important modalities used in modern medical imaging, namely magnetic resonance imaging (MRI), computed tomography (CT) and optical coherence tomography (OCT). These modalities already presenting completely different noise patterns, it is expected that the inventive method provides advantages also in the context of the other methods mentioned above. One of the main advantages of the inventive filtering method is thus the applicability to a wide range of images featuring different kinds of noise.

The results of the method allow the physician to analyze the scan much more precisely and provide insights that have not been visible in the unfiltered image.

Preferably, the method comprises the following succession of steps:

a) Starting from a given voxel, a vector path along a first dimension of the three dimensional volume is built up, connecting a number of voxels of two-dimensional slices of the grid adjacent in the first dimension. The connected voxels represent a spatial neighborhood of the given voxel, that includes structurally related voxels of the three-dimensional grid.

b) The image values of the voxels of the vector path are averaged to obtain a first averaged value, which is assigned to the given voxel position.

c) Steps a) and b) are repeated for a number of voxels.

d) Steps a)-c) are repeated on the first averaged values, employing vector paths along a second dimension being different from the first dimension. Thus, second averaged values are obtained.

e) Steps a)-c) are repeated on the second averaged values, employing vector paths along a third dimension being different from the first and the second dimension. Thus, filtered values are obtained, the filtered values constituting processed image data representing the three dimensional volume.

The first and second averaged values build up a corresponding set of image data representing the three-dimensional volume. Accordingly, if applied to a usual rectilinear three-dimensional grid of voxels, the method amounts to three successive applications of a particular filtering method onto the corresponding image values, whereas the characteristic directions of the three steps are perpendicular to each other.

Tests have shown that this particular succession of steps, i.e. three successive averaging steps, the second step being applied to the result of the first step and the third step being applied to the result of the second step yields particularly good results, in particular in the field of processing image data resulting from various medical imaging methods.

Preferably, the first dimension is chosen to be a dimension of the three-dimensional grid of voxels having a smallest information density. This is usually the dimension in which the physical distance between two neighboring voxels is maximal.

In particular, the image data is composed of a plurality of two dimensional image slices, wherein the first dimension is chosen to be perpendicular to the image slices. Such image data is typically generated by volumetric scans as usually performed in the context of many methods for obtaining biological image data. In these cases, usually one of the axes is run through by a mechanical means (using a step motor or similar) whereas the other axes are run through by micromechanical or electronic means (e.g. using a deflection mirror or similar). Usually, the first (mechanical) axis will yield a larger distance between neighboring voxels than along the other axes.

Most preferably, the second dimension is chosen to be a dimension of the three-dimensional grid of voxels having a higher or equal information density than the first dimension and having a smaller or equal information density than the third dimension. This means that the filtering is done successively for each dimension in order of increasing information density. In other words, the dimension with the largest physical distance between two pixels is considered first, the one with the second largest physical distance second and the one with the smallest distance last. This ordering ensures to take advantage of the real image information present in the 3D scan as much (as long) as possible.

There are alternatives to the succession of steps discussed before, i.e. three successive averaging steps, in particular the following:
1. Starting from a given voxel, the vector paths along all three dimensions are built up, and the averaging is applied to all voxels being part of any of the three vector paths, i.e. there is only one averaging step for a given voxel, directly yielding the filtered image value.
2. The vector paths along the three dimensions are built up separately, and for any given voxel three averaged values (e.g. median values) based on the three vector paths and the initial image values are determined. In a second averaging step, the three averaged values are averaged themselves (e.g. by simple arithmetic averaging) yielding the filtered image value for the given voxel.

Preferably, the spatial neighborhood of the given voxel including the structurally related voxels is determined by a block matching algorithm. Block matching algorithms (BMA) are known from video technology, they are a way of locating matching blocks in a sequence of subsequent digital video frames. This is used e.g. for motion estimation. Generally, in the context of the invention the purpose of the block matching algorithm is to find a block (i.e. 2-dimensional area) from a neighboring two-dimensional slice that most closely matches a given block of the current two-dimensional slice. Usually, the block matching algorithm comprises the steps of calculating an evaluation metric for a plurality of candidate blocks of the neighboring slice and choosing the best matching candidate block based on the calculated metric.

In order to obtain optimum results it is important to employ a method that correctly groups those voxels in the neighborhood of the given voxel that relate to the same structure, in order not to blur or disrupt the picture in the subsequent averaging step.

A preferred evaluation metric of the block matching algorithm is integral projection. It has shown to be very robust and strongly considers contours. The integral projection may be defined as follows:

$$IP = \sum_{x=1}^{m} \left| \sum_{y=1}^{n} A[x,y] - \sum_{y=1}^{n} B[x,y] \right| + \sum_{y=1}^{n} \left| \sum_{x=1}^{m} A[x,y] - \sum_{x=1}^{m} B[x,y] \right| \quad (1)$$

In Eq. (1) A and B represent the two blocks of neighboring slices to be compared with each other, the variables x, y indicating the position of the voxel within the respective block. A small value of IP indicates a high matching of the compared blocks so the smallest value is seen as the best similarity.

The chosen block size depends on the resolution and the average noise particle size of the image volume. Block sizes between 3×3 to 5×5 pixels have been identified as ideal for most of the usual biological or medical image data. Typically larger blocks are used for higher resolutions. Depending on the direction of separation of the adjacent slices, different block sizes may be used for the matching of blocks in the respective slices. The quality of the filtering may be improved by varying the block size and choosing the result having the best image quality.

Similarly, the optimum search area size of the block matching strongly depends on the structural difference between the two considered slices and therefore on the physical resolution or the intra-slice distance respectively. Values between 7×7 and 21×21 pixels have turned out to be suitable for medical image data sets. Again the values may be different depending on the considered direction.

As an alternative to integral projection, other criteria may be used for the block matching. As an example, an exhaustive search may be performed to find the best matching block with respect to e.g. a mean absolute difference (MAD) or sum of squared errors (SSE) measure.

Furthermore, instead of block matching, other algorithms may be used for determining the spatial neighborhood of the given voxel that includes the structurally related voxels. Possible algorithms originate e.g. from the fields of pattern recognition or motion estimation and include methods such as phase correlation or minimum error.

Preferably, the averaging of the image values of the voxels of the vector path includes taking a median value of the image values of the voxels of the vector path. Most preferably, the median is based on the luminance value of the voxels taken into account. Tests have shown that the median yields robust and particularly good results. Furthermore, if required further image values (e.g. color values) of the voxel of the vector path selected by the median (e.g. based on luminance) may be assigned to the given voxel position.

As mentioned above, other averaging methods may be employed such as e.g. mean values (with or without weights), including truncated means, or modes.

Advantageously, the vector paths comprise the given voxel and path portions extending into a positive direction of the respective dimension as well as path portions extending into a negative direction of the respective dimension. This avoids systematic distortions that would occur if only one half space of the neighborhood of the given voxel would be taken into account.

In particular, the positive and the negative portion have the same length, i.e. the given voxel is in the middle of the vector path. Most suitable lengths of the vector paths are 1-6, in particular 2-5, per direction, i.e. the entire vector path has a length between 3 and 13, in particular between 5 and 11. The recommended size depends on the physical resolution and influences the smoothening strength. It may be chosen differently along different dimensions. Longer vectors lead to a stronger filtering. As an example, values of the entire vector path length between 5 and 13 for OCT and 3 to 9 for MRI and CT per dimension have turned out to be appropriate.

The vector path may be shortened if the evaluation metric of the block matching algorithm shows a poor match even for the best matching block. In this case (e.g. if the metric exceeds a certain threshold value), it may be assumed that the three-dimensional structure the given voxel belongs to is not present any more in the slice considered.

In some of the preferred embodiments, the method includes the step of enhancing a contrast of the image data prior to steps a)-e), i.e. prior to noise filtering. It has shown that at least in some applications this leads to the appearance of additional structures. Usually, enhancing the contrast will also enhance noise that is present in the image data. However, the inventive method of noise reduction is particularly effective, such that the increased noise may be essentially removed in a further step, whereas the additional structures uncovered by the enhancing the contrast remain.

The method may further comprise the step of contrast limited adaptive histogram equalization (CLAHE) on the filtered values. CLAHE is a specific method for improving image contrast. It may be applied to two-dimensional slices or the entire three-dimensional volume. It will balance contrast in a given image block, collecting the luminance values into a certain number of bins. Accordingly, when using a small number of bins regions of similar luminance will be created and the resulting image will have only few but contiguous regions of identical luminance values. This may be advantageous for the extraction of structures (the segmentation of the image into different structures).

Accordingly, preferred embodiments of the inventive method further comprise the step of extracting a physiological structure from the processed image data. Especially when applying the two steps mentioned before, extraction and recognition of such a structure will be greatly facilitated. Accordingly, the inventive filtering method supports subsequent processing steps like image segmentation and content recognition. In this respect, the inventive method is a preprocessing step for further processing steps based on the image data.

Preferably, the extraction step includes a filling algorithm, starting from a given seed voxel belonging to the physiological structure and including all voxels meeting a given similarity criterion, thereby creating a binary volume representing the physiological structure. This allows for automatically grouping voxels belonging to the same physiological structure. The seed voxel may be manually set by an operator or there may be an algorithm for the identification of voxels that clearly belong to a certain structure and that are therefore good candidates for seed voxels.

The inventive method is particularly suited for processing retinal OCT image data, in particular image data representing retinal and/or choroidal blood vessels. Such data evinces a very challenging noise pattern with characteristic strong speckle noise. Accordingly, the processing is particularly demanding. Tests have shown that using the inventive method, in particular when combined with the initial enhancement of contrast and the application of CLAHE to the filtered values, yields surprisingly good results, allowing for clearly identifying the choroidal blood vessels. Therefore, this particular application of the inventive method allows for in vivo analysis of the choroidal blood vessels, including those underneath the choroid.

Other advantageous embodiments and combinations of features come out from the detailed description below and the totality of the claims.

BRIEF DESCRIPTION OF THE DRAWINGS

The drawings used to explain the embodiments show.

In the figures, the same components are given the same reference symbols.

PREFERRED EMBODIMENTS

Figure 1:
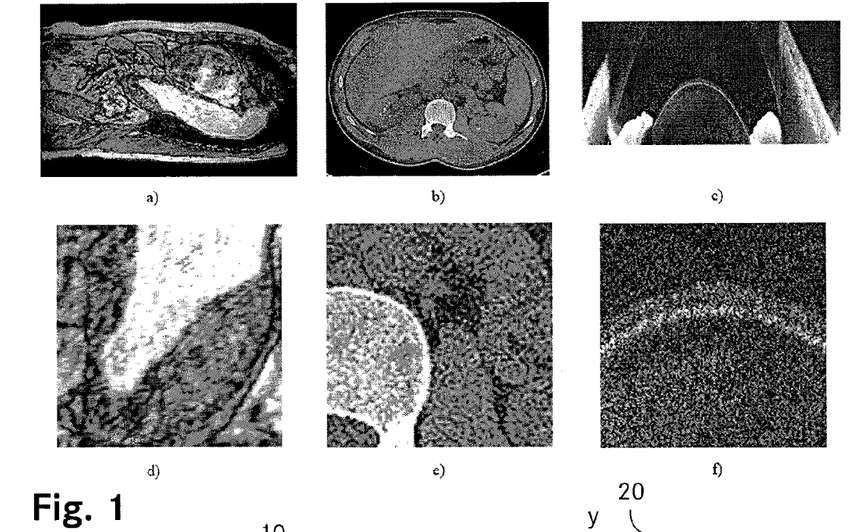
FIG. 1 sample slices from different imaging modalities.

The FIG. 1 shows sample slices from different imaging modalities, namely a) magnetic resonance imaging (MRI), b) computed tomography (CT) and c) optical coherence tomography (OCT). The images d)-f) of the second row show an enlarged region of the slice of the image stack shown in the first row. As can be seen from the enlarged images, noise is substantial and its structure differs from modality to modality.

Figure 2:
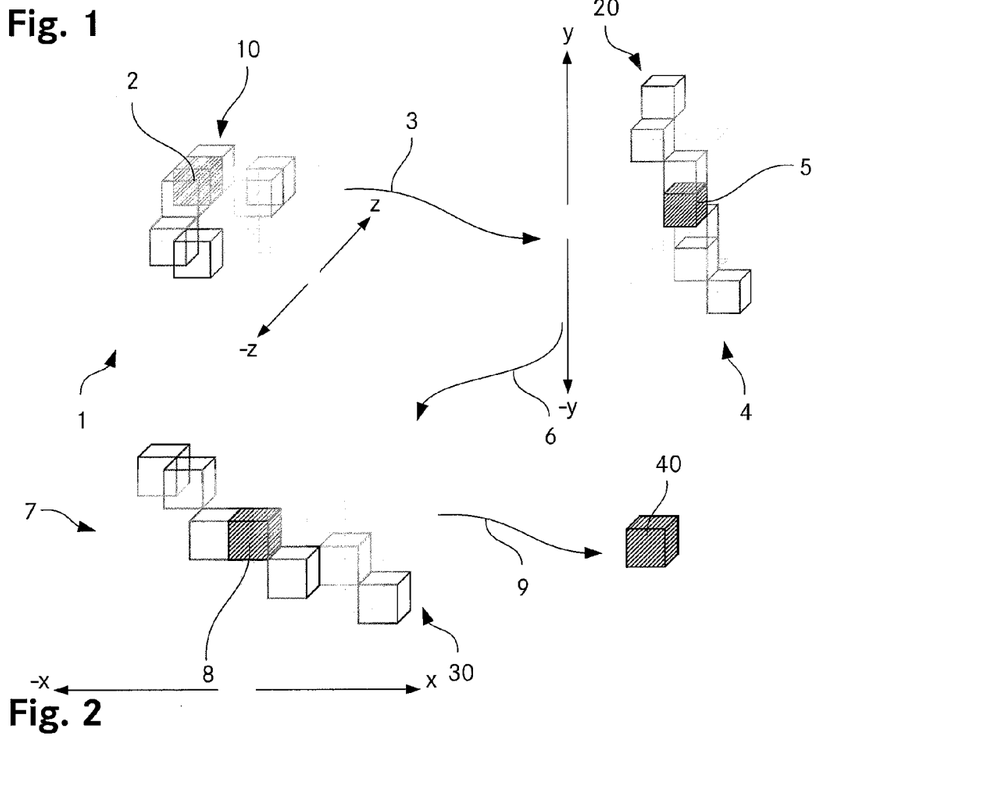
FIG. 2 a schematic representation of the principal steps of a method according to the invention.

The FIG. 2 is a schematic representation of the principal steps of a method according to the invention. The Figure schematically shows regions of a regular three-dimensional grid of voxels. Every voxel represents a cuboid spatial element, the edges of the cuboid running along three dimensions rectangular to each other, denoted by X, Y, and Z, respectively. It is assumed that the grid represents three-dimensional image data, a resolution in direction Z being smaller than in the other two directions X and Y. This is the typical situation if the three-dimensional image data is constituted by a stack of two-dimensional slices (in the XY plane).

As further described below, the method comprises an averaging step where an averaged (filtered) value is determined for every voxel of the space taken into account. The FIG. 2 shows the corresponding steps for a given voxel 2.

First, starting from the given voxel 2 of the initial grid 1, representing the input image data, a vector path 10 is determined. This path includes the given voxel 2 and additionally 3 voxels in positive Z direction and 3 voxels in negative Z direction. The determination of the vector path 10 is described in more detail below.

This step is repeated for all voxels of the space taken into account.

In a second step 3, for every voxel the median of the luminance value of the voxels of the vector path 10 assigned to the respective voxel is determined and assigned to the respective voxel position. This yields a first averaged grid 4, a section of which being shown in FIG. 2.

Next, the aforementioned steps are basically repeated, however the vector paths 20 will be constituted of a given voxel 5 as well as 3 voxels in positive Y direction and 3 voxels in negative Y direction. After having determined the vector paths 20 for all voxels of the first averaged grid 4, in a further step 6 the median of the luminance value of the voxels of the vector path 20 assigned to the respective voxel is determined and assigned to the respective voxel position. This yields a second averaged grid 7, a section of which being shown in FIG. 2.

Next, the aforementioned steps are basically repeated, however the vector paths 30 will be constituted of a given voxel 8 as well as 3 voxels in positive X direction and 3 voxels in negative X direction. After having determined the vector paths 30 for all voxels of the second averaged grid 7, in a further step 9 the median of the luminance value of the voxels of the vector path 30 assigned to the respective voxel is determined and assigned to the respective voxel position. This yields the filtered value of the given voxel 40. The plurality of filtered values constitutes the filtered image data.

In the following, the determination of the vector paths 10, 20, 30 and the median filtering are described in more detail. The determined relation vector path 10, 20, 30 of a particular dimension D for a specific voxel $I_x$ at position x:=[x, y, z] in the image volume I is viewed as the spatial neighborhood $\overline{\eta}_x^D$ of that voxel, whereas this neighborhood is sub classified into positive and negative neighborhood, depending on whether it runs in the positive or negative direction of the considered dimension $(\overline{\eta}_x^{D+}, \overline{\eta}_x^{D-})$.

If I represents the original image volume and $I_x$ the value of a voxel at position x in that volume, the following equations describe the filter:

$$I_x^Z = \text{med}(I_{n_0} \ldots n_{|d|}) | n := \{x, \overline{\eta}_x^{Z+}, \overline{\eta}_x^{Z-}\}$$

$$I_x^Y = \text{med}(I_{n_0} \ldots n_{|d|}^Z) | n := \{x, \overline{\eta}_x^{Y+}, \overline{\eta}_x^{Y-}\}$$

$$\hat{I}_x = I_x^X = \text{med}(I_{n_0} \ldots n_{|d|}^Y) | n := \{x, \overline{\eta}_x^{X+}, \overline{\eta}_x^{X-}\} \quad (2)$$

med( ) hereby denotes the median and n holds the spatial voxel coordinates (positions) of the values included for the median. This way the negative and positive neighborhoods as well as the value at point x are considered for the median each time. By using completely individual neighborhoods $(\overline{\eta}_x^{D+}, \overline{\eta}_x^{D-})$ for every single voxel (x) in the volume, a resolution loss while filtering is avoided. In Eq. (2) it is assumed that the physical information density of each dimension increases from Z to Y to X.

The size of the neighborhood i.e. the number of vectors considered in the path of one particular voxel, i.e. the filter kernel size, is parametrizable. In the example shown in FIG. 2, a value of 3 per direction has been chosen, resulting in 7 values for the whole path. However, different values such as values between 1 and 6 per direction, resulting in 3 to 13 values for the whole path may be used when processing e.g. three-dimensional medical images. In particular, values of between 5 to 13 for OCT and 3 to 9 for MRI and CT per dimension may be suitable. This shows the correlation between physical resolution and filter kernel size: The higher the resolution, the more voxels represent a continuous physical size and therefore can be considered for information redundancy in a voxel's neighborhood.

In the context of building up the vector paths 10, 20, 30, the neighborhood determination is realized by a block matching algorithm. The block matching criterion is integral projection due to its noise robustness and strong contour consideration:

$$IP = \sum_{x=1}^{m} \left| \sum_{y=1}^{n} A[x, y] - \sum_{y=1}^{n} B[x, y] \right| + \sum_{y=1}^{n} \left| \sum_{x=1}^{m} A[x, y] - \sum_{x=1}^{m} B[x, y] \right| \quad (3)$$

In Eq. (3) A and B represent the two blocks to compare with each other. A small value of IP indicates a high matching of the compared blocks so the smallest value is seen as the best similarity.

The chosen block size depends on the resolution and the average noise particle size of the image volume. Block sizes between 3×3 to 5×5 pixels have been identified as ideal for the processing of usual three-dimensional medical images, whereas typically larger blocks are used for higher resolutions.

The recommended search area size of the block matching strongly depends on the structural movement between the two considered slices and therefore on the physical resolution or the intra-slice distance in the given dimension respectively. For medical images, search areas between e.g. 7×7 and 21×21 pixels are suitable.

It is to be noted that in the course of the above described method several calculation steps, in particular with respect to the neighborhood determination, are performed more than once. In order to reduce the computational overhead, intermediate results may be buffered and used for subsequent calculations.

Figure 3:
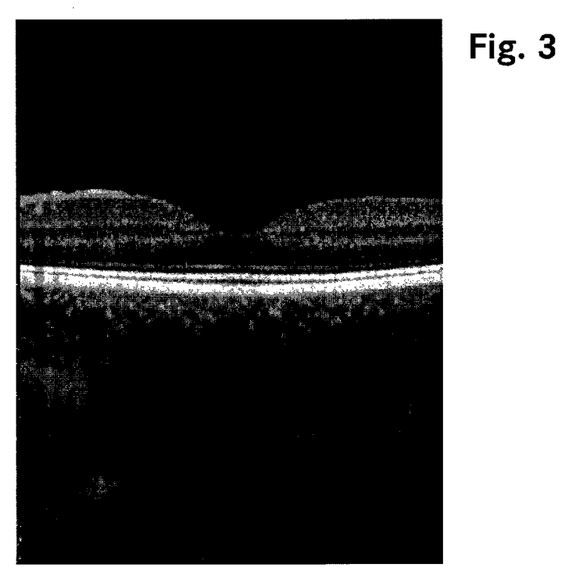
FIG. 3 a slice of the original image data of a retinal C-scan OCT.
Figure 4:
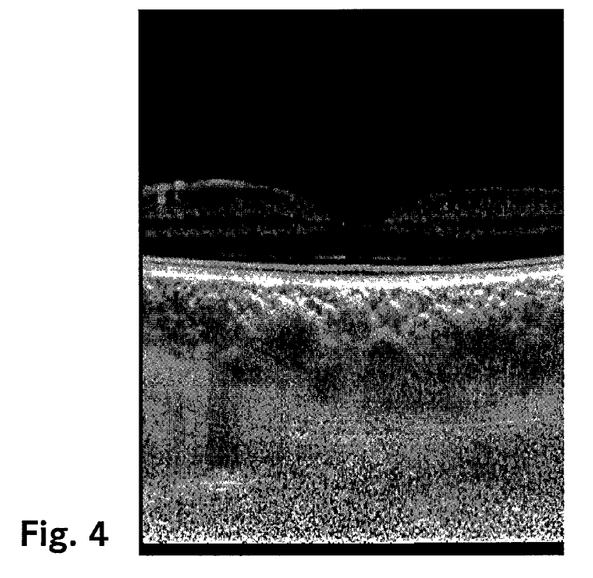
FIG. 4 the result of a contrast enhancing step.
Figure 5:
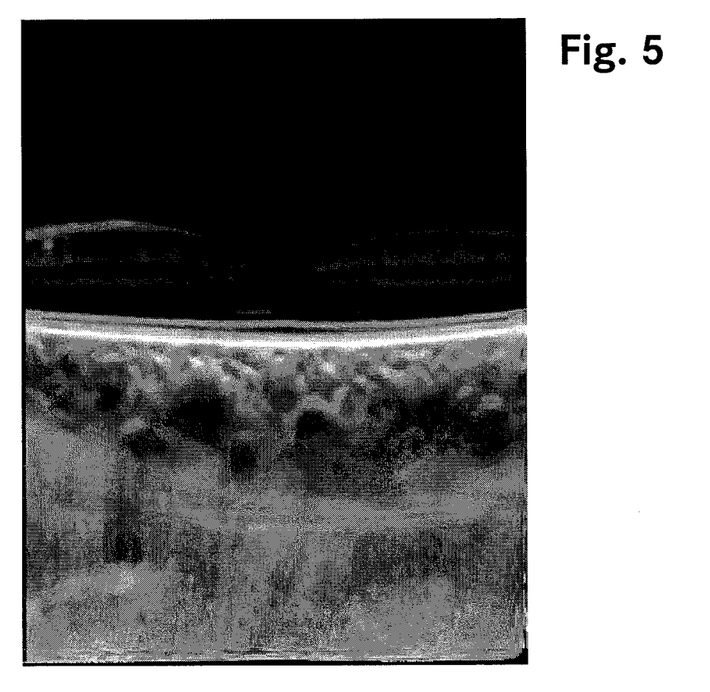
FIG. 5 the result of filtering employing the inventive method.
Figure 6:
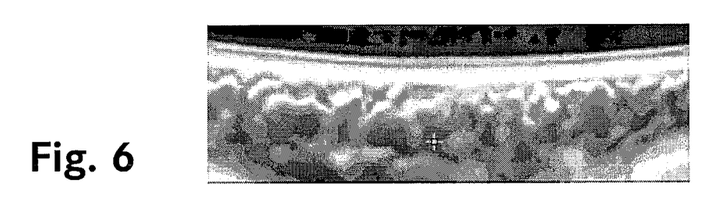
FIG. 6 the result of a CLAHE filtering step.
Figure 7:
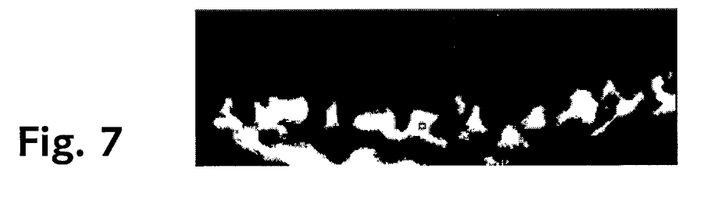
FIG. 7 the extracted structure of the choroidal blood vessels in a given slice.

The extraction of choroidal blood vessels from a sorted sequence of OCT image data representing a volume is described in connection with FIGS. 3-7. FIG. 3 shows a slice of the original image data. FIG. 4 shows the result of a contrast enhancing step. FIG. 5 shows the result of filtering employing the inventive method. FIG. 6 shows the result of a CLAHE filtering step. Finally, FIG. 7 shows the extracted structure of the choroidal blood vessels in a given slice. Using a number of slices, the three-dimensional form of the choroidal blood vessels may be reproduced. It is to be noted that the FIGS. 6 and 7 do not relate to the slice shown in FIGS. 3-5 but to a different set of image data.

The sequence of OCT image data is considered to be a stack of single images representing a three-dimensional volume. A sample slice is shown in FIG. 3. First of all, the contrast of the single images is enhanced by the method proposed in M. J. A. Girard, N. G. Strouthidis, C. R. Ethier, J. M. Mari, "Shadow Removal and Contrast Enhancement in Optical Coherence Tomography Images of the Human Optic Nerve Head", Invest. Ophthalmol. Vis. Sci. Sep. 28, 2011 vol. 52 no. 10 7738-7748.

The result of this step is shown in FIG. 4, it is an image volume which shows equalized contrast in Y direction, i.e. from top to bottom. Shadows cast by vessels lying in the scan area are reduced. Accordingly, the visibility of vessels lying in the ocular fundus is improved. However, at the same time noise in these regions is also increased.

Next, the contrast enhanced image volume is filtered using the method according to the invention. The dimension with the largest physical distance between two pixels is considered first, the one with the second largest physical distance second and the one with the smallest distance last. A total vector path length of 5 or 7 is chosen. This reduces speckle noise to a minimum, see FIG. 5.

In a further step, the filtered image volume is processed using the CLAHE algorithm (contrast limited adaptive histogram equalization). A block size of 127×127 pixels and a target histogram size of 12 values are employed. CLAHE aims at equalizing the local contrast in the block (histogram equalization). In the context of the described method, the number of luminance values is reduced to N bins, N being smaller than the number of different luminance values of the original image. Thereby, regions of similar luminance are grouped, and an image is produced that features only a few but contiguous regions of identical luminance values, see FIG. 6. CLAHE filtering may be applied to single two-dimensional slices or to the entire three-dimensional volume.

As can be seen from FIG. 6 the regions representing the choroidal blood vessels take on mostly the same grayscale value, parts of them having a darker shade of gray. This characteristic may be employed in order to extract the vessels. In a first embodiment, a three-dimensional flood-fill algorithm is employed, which starts from a manually determined seed point belonging to a blood vessel and floods the entire volume of the vessel in the entire image stack. For that purpose, all voxels are included in the flood-fill which has a luminance that matches the luminance of the seed point within a certain tolerance. Furthermore, voxels having a lower luminance value are always included as they do not constitute edges of the vessels but belong to the vessels themselves. The tolerance is chosen in such a way that image regions having luminance values higher than that of the vessels are not included. Finally, a binary image volume is obtained, representing the blood vessels, see the white areas in FIG. 7.

In a second embodiment a "rolling marble segmentation" is employed instead of the usual flood-fill described before. Again, a seed point belonging to the blood vessel is manually determined. Next, a sphere (marble) of a given radius is positioned centered on that seed point. The dimension of the sphere will be chosen in such a way that the marble does not touch the edge of the vessel in any of its surface points. The voxels covered by the marble are assumed to be part of the vessel. Further, a modified flood-filling process is carried out, in which the marble is positioned with its center on points adjacent of the seed point. It is determined whether the sphere touches the edge of the vessel. This is determined by assessing the mean luminance of the voxels being in the region covered by the sphere. If this luminance value exceeds a certain threshold, the voxels newly covered by the marble are not included as candidates into the flood-filling process. Otherwise, the voxels are included and the marble is further moved to adjacent center points. By variation of the marble cross-section, this second method allows for segmenting only specific classes of vessels, e.g. those having a certain minimum thickness and that are reachable from the seed point.

EXAMPLES

The performance of the method has been compared to prior art filters in the context of three-dimensional OCT as this modality represents the commonness of all considered modalities (MRI, CT, OCT) best and evinces a very challenging noise pattern with its characteristic strong speckle noise.

The following filtering methods are often used in 3D medical image denoising:

Total Variation Denoising (L. I. Rudin, S. Osher, and E. Fatemi, "Nonlinear total variation based noise removal algorithms," Physica D 60, 259-268, 1992), Lee (J. S. Lee, "Speckle analysis and smoothing of synthetic aperture radar images", Graph. Model. Im. Proc. 17(1), 24-32, 1981), Frost (V. S. Frost, J. A. Stiles, A. Josephine, K. S. Shanmugan, and J. C. Holtzman, "A model for radar images and its application to adaptive digital filtering of multiplicative noise", IEEE Trans. Pattern Anal. Mach. Intell. 4(2), 157-166, 1982), Anisotropic Diffusion (P. Perona and J. Malik, "Scale-Space and Edge Detection Using Anisotropic Diffusion", IEEE Trans. Pattern Anal. Mach. Intell., vol. 12, no. 7, pp. 629-639, 1990).

The noise reduction performance of the method according to the invention has been measured. For that purpose, original noise-free images and the denoised images, which are the denoising result of a noise-added version of the original, have been compared. The analyses focussed on OCT due to its challenging speckle noise and the fact that OCT represents most of the common structural situations found also in MRI and CT like organ surfaces, tubular vessels, uniform tissue areas and spaces with homogenous background.

For 2D OCT a noise-reduced scan can be obtained by averaging several 2D scans of the same physical position. For 3D OCT only some experimental research devices today allow instantaneous recapturing of a whole image volume in a short enough period to be used for averaging, but even then, only with a very small number of volumes. Due to that, a synthetic phantom volume representing an OCT test sample has been used. The synthetic volume represented objects with key characteristics like vessels, tissue and layers found not only in OCT but also in other modalities, in particular MRI and CT. An image stack with OCT key aspects like blood vessels, the choroid and depth-dependent decreasing global reflectivity similar to a retinal C-scan OCT has been generated. The blood vessels vary in depth, are tortuous and translate within the frames.

In a next step, speckle noise has been artificially added to it. Speckle noise is a Rayleigh-distributed multiplicative noise. The simulation of speckle noise can therefore be realized by implementing this statistical model. With this setup all common noise measurement methods can easily be performed, taking the noise-free original and the denoised result into account.

To determine the noise reduction capability the Peak Signal to Noise Ratio (PSNR), the Root Mean Square Error (RMSE) and the Structural Similarity (SSIM) have been determined for the filtering methods mentioned above and for the filtering method according to the invention. For a fair and more representative comparison with the filter according to the invention, three-dimensional neighborhoods for all of these involved filters have been taken into account, extending them to 3D-filters. Both adaptive filters, Frost and Lee, in their original design suppose normal-distributed noise. Due to the fact that speckle noise in OCT follows a Rayleigh distribution, the statistical properties in the Lee and Frost filter have been adapted to the Rayleigh distribution.

The best parameterization for each filter method has been evaluated and applied to the artificial noisy test image volume. The subsequent measurements were all done considering the noise-free original of the used test image volume. The quantitative results show that the filter according to the invention clearly exceeds all of the compared filters in all quantitative measurement criterions:

|  | PSNR | RMSE | SSIM |
|---|---|---|---|
| Total Variation | 31.314 | 6.578 | 0.966546 |
| Lee Filter | 34.622 | 4.495 | 0.979956 |
| Frost Filter | 36.286 | 3.711 | 0.988084 |
| Anisotropic Diffusion | 33.677 | 5.012 | 0.973138 |
| Proposed | 41.242 | 2.099 | 0.992382 |

The inventive method not only overtops the other filters in the classical noise assessment indicators PSNR and RMSE but also in the SSIM measurement. As the SSIM is able to assess the denoising performance not only by cumulative differences or variations, but also by considering the structural differences a filter has caused in the filtered image, the favorable SSIM value shows that the structural information is strongly preserved.

Figure 8:
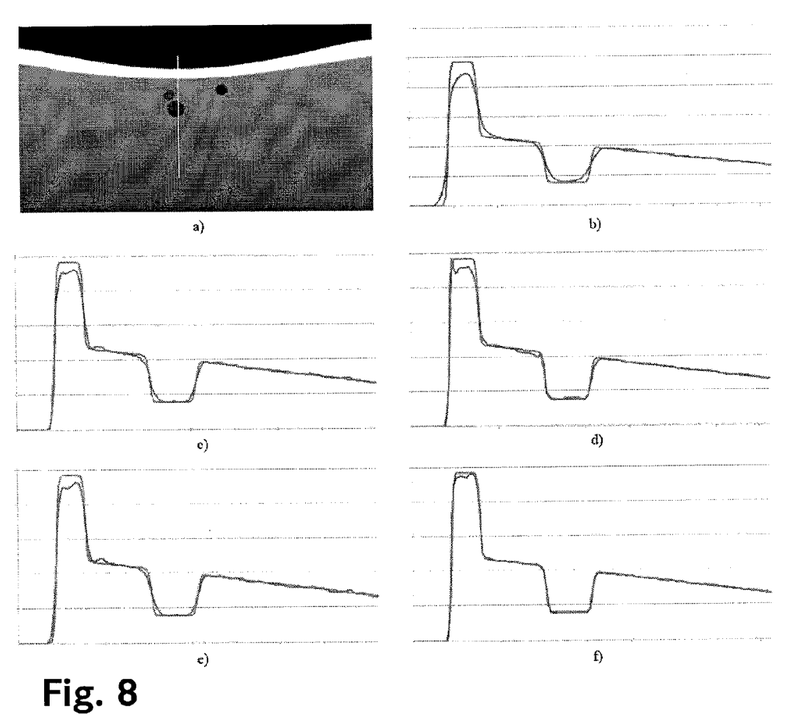
FIG. 8 profile plots of several filters.

The FIG. 8 shows profile plots of the considered filters in comparison to the filtering process according to the invention. FIG. 8 a) shows a slice of a synthetic test volume with a highlighted profile line. As described above, artificial speckle noise has been added to the image of the test volume and different filters have been applied to the noised image data.

The profile plots show the respective filtering results in comparison to the original profile (substantially angular line). As can be seen clearly from the plots, the method according to the invention, the result of which being represented in FIG. 8 f) closely follows the original profile which is an indication of almost completely removal of noise in all areas. At the same time the filter manages to avoid smoothing out or fraying of the simulated blood vessel edges. This is in clear contrast to the results of b) Total Variation Denoising, c) Lee, d) Frost, and e) Anisotropic Diffusion.

Figure 9:
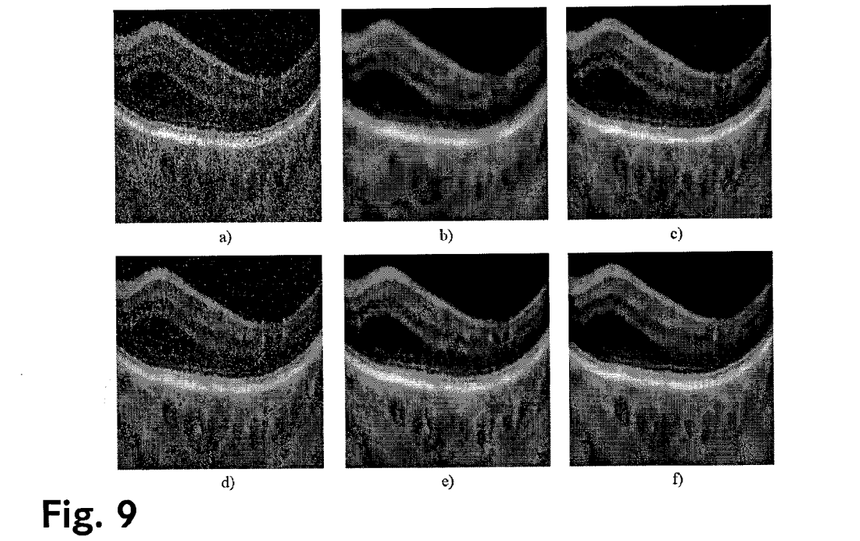
FIG. 9 an original OCT sample and the results of several filters.

The FIG. 9 allows for a visual comparison of the filtering characteristics of the inventive method with the four prior art filtering methods, showing an original OCT sample a) and the results the considered filters with a real OCT image stack:
b) Total Variation Denoising,
c) Lee,
d) Frost, and
e) Anisotropic Diffusion.

The FIG. 8 f) shows the result of a filtering process according to the invention. As can be seen from the Figure, Total Variation Denoising, Frost, Lee and Anisotropic Diffusion all suffer from insufficient preservation of important contours and are still distorted by strong noise artifacts, whereas the method according to the invention shows clear and even enhanced contours and homogenized related tissue layers.

Figure 10:
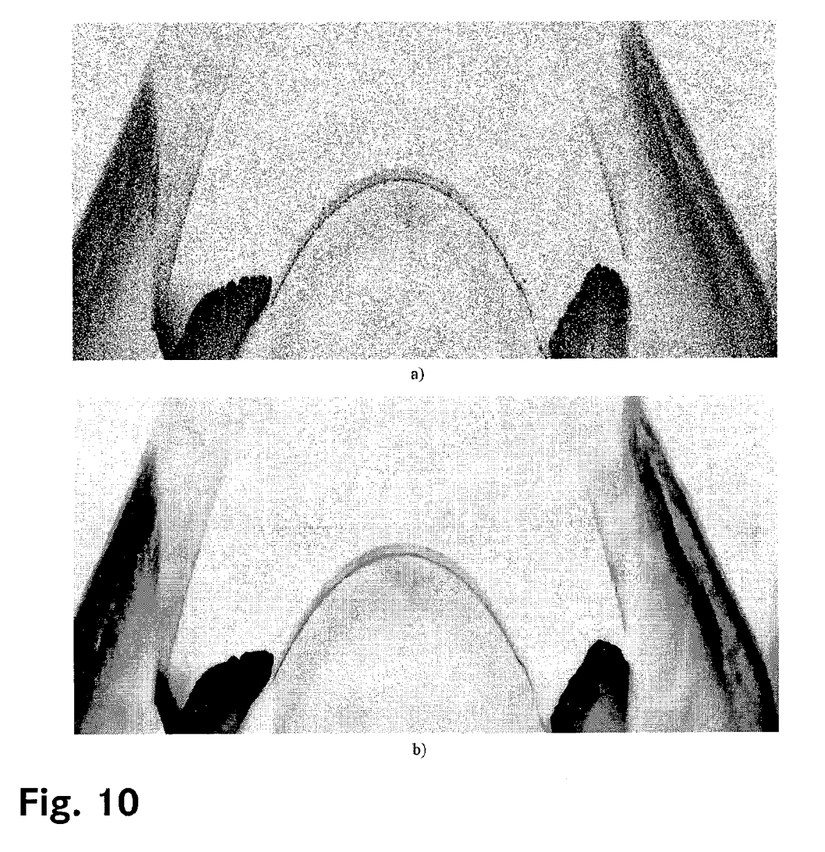
FIG. 10 an unfiltered slice of an anterior pig eye OCT volume and the same slice after filtering the image volume with the filter method according to the invention.

The FIG. 10 shows a) an unfiltered slice of an anterior pig eye OCT volume (inverted grayscale) and b) the same slice after filtering the image volume with the filter method according to the invention. Per dimension, 11 values have been used. The structures of the filtered OCT scan of the anterior pig eye segment are shown in a detailed and contour-sharp manner. Important contours are enhanced while no image details are lost. The image filtered with the inventive method can be classified as almost noise-free.

Further studies related to the filtering of MRI and CT volume data using the method according to the invention. The filtered MRI images showed cleanly homogenized related areas and improved contour visibility at the same time. In a filtered slice of a human upper body part MRI, the vertebrae have been represented with clean borders to the intervertebral discs and the aorta kept its shadings but was represented almost noise-free. The noise has been eliminated nearly completely, preserving or even improving the structural details at the same time. Also, the filtered CT images exhibited minimized noise while preserving even finest vessel details.

The invention is not restricted to the described embodiments. Inter alia, depending on the image data (used imaging technology, resolution, size distribution of the imaged structures, noise level etc.) different parameters and/or particular methods for the different steps may be employed.

Thereby, the invention finds a wide range of applications outside of MRI, CT or OCT imaging and even outside the processing of biological image data.

In summary, it is to be noted that the invention provides a method that allows for efficient noise reduction of three-dimensional image data, in particular in the context of medical imaging applications.

The invention claimed is:

1. A method for processing image data representing a three-dimensional volume, the data comprising image values for a three-dimensional grid of voxels, the method comprising the steps of:
a) starting from a given voxel building up a first individual vector path employing a neighborhood determination method grouping those voxels in the neighborhood of the given voxel that relate to the same structure, the first vector path extending along a first dimension of the three dimensional volume, connecting a number of voxels of two-dimensional slices of the grid adjacent in the first dimension, the connected voxels representing a structural neighborhood of the given voxel, which is a spatial neighborhood of the given voxel, including the voxels of the three-dimensional grid that are structurally related to the given voxel;
a') generating a first averaged value for the given voxel position by averaging image values of voxels of the first vector path;
a") generating first averaged values for a number of voxels by repeating steps a) and a') for the number of voxels;
b) starting from the first averaged value for the given voxel building up a second individual vector path employing a neighborhood determination method grouping those voxels in the neighborhood of the given voxel that relate to the same structure, the second vector path extending along a second dimension of the three dimensional volume, the second dimension being different from the first dimension, connecting a number of voxels of two-dimensional slices of the grid adjacent in the second dimension, the connected voxels representing a structural neighborhood of the given voxel, which is a spatial neighborhood of the given voxel, including the voxels of the three-dimensional grid that are structurally related to the given voxel;
b') generating a second averaged value for the given voxel position by averaging image values of voxels of the second vector path;
b") generating second averaged values for the number of voxels by repeating steps b) and b') based on the first averaged values for the number of voxels along the second vector path;
c) starting from the second averaged value for the given voxel building up a third individual vector path employing a neighborhood determination method grouping those voxels in the neighborhood of the given voxel that relate to the same structure, the third vector path extending along a third dimension of the three dimensional volume, the third dimension being different from the first and the second dimensions, connecting a number of voxels of two-dimensional shoes of the grid adjacent in the third dimension, the connected voxels representing a structural neighborhood of the given voxel, which is a spatial neighborhood of the given voxel, including the voxels of the three-dimensional grid that are structurally related to the given voxel;

c') generating a third averaged value for the given voxel position by averaging image values of voxels of the third vector path; and d) generating filtered values for the number of voxels by repeating steps c)-c') based on the second averaged values for the number of voxels along the third vector path.

2. The method as recited in claim 1, wherein the first dimension is chosen to be a dimension of the three-dimensional grid of voxels having a smallest information density.

3. The method as recited in claim 2, wherein the image data is composed of a plurality of two dimensional image slices, wherein the first dimension is chosen to be perpendicular to the image slices.

4. The method as recited in claim 2 or 3, wherein the second dimension is chosen to be a dimension of the three-dimensional grid of voxels having a higher or equal information density than the first dimension and having a smaller or equal information density than the third dimension.

5. The method as recited in claim 1, wherein the vector paths comprise the given voxel and path portions extending into a positive direction of the respective dimension as well as path portions extending into a negative direction of the respective dimension.

6. The method as recited in claim 1, further comprising the step of enhancing a contrast of the image data prior to steps a)-d).

7. The method as recited in claim 1, further comprising the step of contrast limited adaptive histogram equalization on the filtered values.

8. The method as recited in claim 1, further comprising the step of extracting a physiological structure from the processed image data.

9. The method as recited in claim 8, wherein the extraction step includes a filling algorithm, starting from a given seed voxel belonging to the physiological structure and including all voxels meeting a given similarity criterion, thereby creating a binary volume representing the physiological structure.

10. Use of the method as recited in claim 1 for processing biological image data, preferably image data obtained from a positron emission tomography (PET), a single-photon emission computed tomography (SPECT) and/or an ultrasonic imaging (US) process, most preferably image data obtained from a magnetic resonance imaging (MRI), a computed tomography (CT) and/or an optical coherence tomography (OCT) process.

11. Use of the method as recited in claim 1 for processing retinal OCT image data.

* * * * *